Dec. 8, 1953    J. H. MULLINS    2,661,817
WHEEL STOPPING DEVICE
Filed Feb. 24, 1951
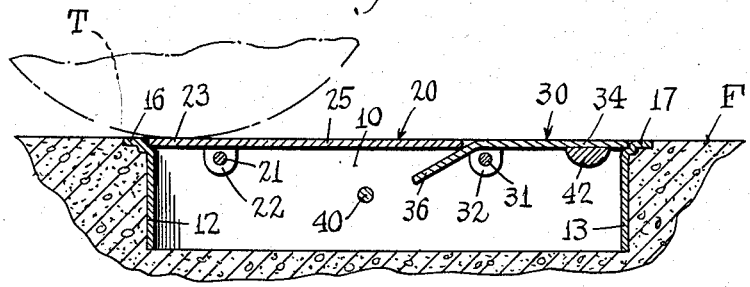
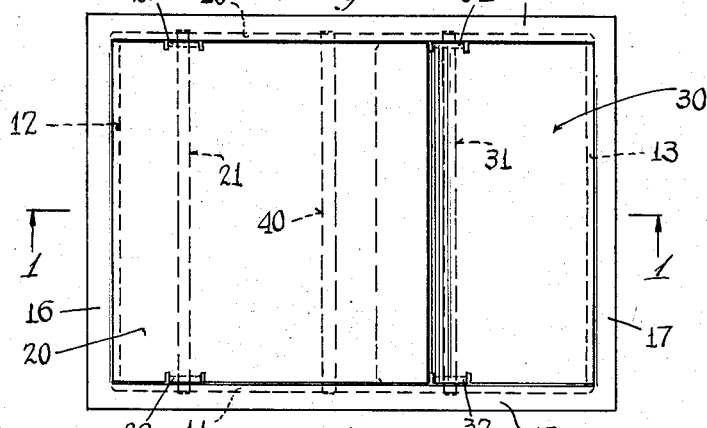
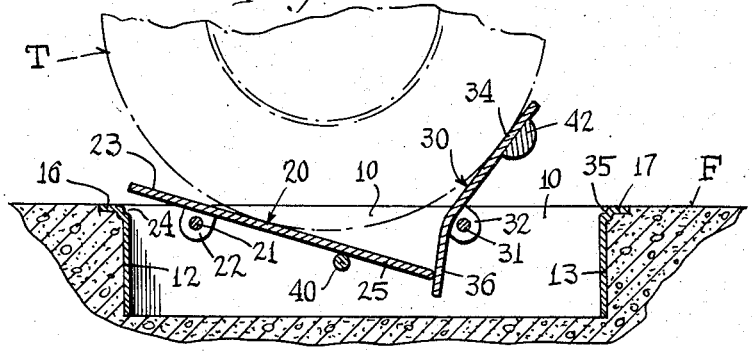
Inventor
James H. Mullins
By
Johnson and Kline
Attorneys

Patented Dec. 8, 1953

2,661,817

UNITED STATES PATENT OFFICE 2,661,817

WHEEL STOPPING DEVICE

James H. Mullins, Westport, Conn., assignor of one-third to Stephen A. Budner and one-third to Richard Hauser, both of Westport, Conn.

Application February 24, 1951, Serial No. 212,538

6 Claims. (Cl. 188—32)

The present invention relates to an automobile stopping device and more particularly to an automobile stopping device which will stop an automobile at a predetermined place and prevent it from passing forwardly beyond that place and deter it from moving rearwardly therefrom without having any normally projecting members.

In the driving of automobiles or other vehicles into enclosures, such as garages, car ports, or the like, it is often necessary to drive the vehicle front end of the vehicle rather close to the front wall of the enclosure, so that all of the vehicle is within the enclosure to permit its doors to be closed. In recent years, this necessity has become more widespread and more acute due to the fact that the overall length of cars has been increased considerably by the extensive use of ornamental grille work, baffles and splash pans, larger fenders with fender lights and fancy bumpers and bumper guards. As a result, the foremost part of a car is frequently as much as three feet or more in front of the point of road contact of the front tires, thus making it more difficult for the driver to judge where the front of the car is, as well as requiring that the car be placed closer to the front wall to provide room for its increased overall length. In a similar way, the rearmost part of a car has been extended more and more, mainly due to the demands of the public for larger luggage compartments, which merely makes necessary the driving of the car even closer to the front wall so that the garage doors can be closed.

As a consequence, the driving of cars into garages has become a rather careful maneuver, with considerable damage often being done to the garage or to the car itself as a result of errors of judgment of distance or lack of proper depth perception.

Chocks of sufficient height, in the form of bricks, blocks, lumber, or the like, have frequently been placed on the garage floor at the desired places so as to stop the car or warn the driver of the car that the car is close to the front wall of the garage when the front tires abut the chocks. However, these chocks, if movable, may be shifted about inadvertently while the car is out of the garage and be in the wrong place when they are to be used, so that the driver will either stop short of the proper place or more likely run into the front wall of the garage to cause damage. On the other hand, if the chocks are immovably secured to the garage floor, a hazard is created for anyone, such as children, who may be walking about or playing in the garage and may accidently stumble over the chocks and hurt themselves. Inasmuch as these chocks would have to be placed as much as three feet or more from the front wall, it will also be appreciated that the hazardous possibilities cannot be ignored by wishfully thinking that the chocks are close enough to the wall so that none will stumble over them.

It is a purpose of the present invention to provide an automobile stopping device capable of automatically and positively stopping a car at a predetermined place.

It is a further purpose of the present invention to provide an automobile stopping device which is normally substantially flush with the ground level and will not present any dangers or hazards to anyone walking about or playing in the garage.

It is a still further purpose of the present invention to provide an automobile stopping device which will prevent the car from passing beyond a predetermined place and will deter the car from moving rearwardly from that place.

A feature of the present invention is the provision of a device for holding a car in a predetermined place without requiring the brakes to be set or the car to be left in gear.

Other purposes and features of the present invention will become clear from a consideration of the following description of the preferred embodiment of the invention, reference being had to the accompanying drawing in which:

Figure 1 is a cross sectional view in elevation of the automobile stopping device of the present invention, taken on the line 1—1 of Fig. 2, showing the front tire of a car as it initially contacts the stopping device.

Fig. 2 is a plan view of the automobile stopping device.

Fig. 3 is a cross sectional view in elevation of the automobile stopping device, showing the front tire of a car in stopped position in the device.

In the preferred embodiment of the present invention, as shown in the drawings, the automobile stopping device comprises mounting means, herein disclosed as a rectangular frame including spaced side walls or supporting members 10, 11 and spaced end walls 12, 13. The upper edges of the spaced walls have outwardly turned flanges 14, 15, 16, 17, respectively, and the frame is positioned in a rectangular receptacle or recess in the floor F of the garage or other enclosure, so that the upper surfaces of the flanges will lie substantially flush with the surface of the garage floor F.

Carried by the mounting means is a flat operating member or plate 20 pivotally mounted on a rod or shaft 21 by means of downwardly extending ears 22, so as to be capable of pivotal movement from the position shown in Fig. 1 to that shown in Fig. 3. The rod 21 is mounted in openings formed in the side walls 10, 11 and its position is so selected that the upper surface of the operating plate 20 will also lie substantially flush with the garage floor F, as shown in Fig. 1. A rearwardly extending positioning arm 23 of the operating plate 20 rests on a notch 24 formed in the end flange 16, and a forwardly extending arm 25 of the plate rests on a pivoted stopping plate 30.

The stopping plate 30 is pivotally mounted on a rod or shaft 31 by means of downwardly extending ears 32, so as to be capable of pivotal movement from the position shown in Fig. 1 to that shown in Fig. 3. The rod 31 is mounted in openings formed in the side walls 10, 11 and its position is so selected that a forwardly extending arm 34 of the stopping plate 30 rests in a notch 35 formed in the end flange 17 and lies with its upper surface substantially flush with the garage floor F, as shown in Fig. 1. A rearwardly extending arm 36 of the stopping plate 30 is bent downwardly at an angle and lies under the forward edge of the operating plate 20, as shown.

A stop rod 40 is mounted in openings in the side walls 10, 11 and its position determines the limit of the pivotal movement of the operating plate 20 and consequently the resulting pivotal movement of the stopping plate 30, as shown in Figure 3.

In order to return the plate 30 to normal position and to prevent inadvertent operation of the plates such as by a person walking thereover, I have augmented the weight of the forward end of plate 30 by a weight 42 which is secured to the underside of the forwardly extending arm 34 and tends to keep the same in the position flush with the floor F, as shown in Figure 1. This will also tend to maintain the operating plate 20 in the position shown therein, whereby a uniformly flat surface is normally presented by the plates which are flush with the surface of the garage floor F. The weight 42 is such that the operating plate 20 and the stopping plate 30 will remain in the flush positions shown in Figure 1, if a person walks thereon but will yield and pivot downwardly to the positions shown in Fig. 3, upon the exertion of a heavier force, such as by the weight of a car. A similar weight may be secured to the underside of the rearwardly extending arm 23 of the actuating or operating plate 20 to increase the closing effect of the plates. The notches 24, 35 will maintain the flush relationship of the plates 20, 30 to the garage floor F no matter how heavy the secured weights are and prevent the plate 20 from moving counterclockwise or the plate 30 from moving clockwise out of the positions shown in Fig. 1. Further, for sake of economy, the frame lining the recess may be eliminated and the plates pivotally mounted on and supported directly by the concrete. If desired, a spring or other equivalent means, may be used in place of the weights secured to the plate underside for a similar purpose.

The manner of use or operation of the automobile stopping device of the present invention is as follows:

When a car is driven into the garage, its front tire T will first contact the rearwardly extending arm 23 of the operating plate 20 but nothing will happen inasmuch as the notch 24 will prevent any pivotal movement of plate 20 in a counterclockwise direction. As the car continues forwardly and passes over the rod or shaft 21 and rolls on the forwardly extending arm 25, exerting force thereon, the plate 20 will be pivotally moved in a clockwise direction until it reaches its limiting stop rod 40. At the same time the force will be transmitted by arm 25 through the force-receiving arm 36, whereby the stopping plate 30 will be pivotally rotated in a counterclockwise direction with the rearwardly extending arm 36 being depressed into the recess and the forwardly extending arm being elevated and raised out of the recess, as shown in Figure 3.

The car continues rolling forwardly until the tire T abuts the elevated stopping arm 34 and attempts to pivot it downwardly about rod 31. However, at that moment, the depressed arm 36 extends substantially perpendicularly to the operating plate 20 and any force exerted by the depressed arm 36 will be exerted lengthwise of the plate 20 and substantially directly against the rod or shaft 21. As a result, there will be practically no tendency of the plate 20 to pivot upwardly and the plates 20, 30 will remain as they are in a stable, locked relation with the tire naturally positioned in its desired place relatively to the front wall of the garage. The tire T as shown in Fig. 3 is, in effect, located in a trough and it not only cannot move forwardly but it cannot unintentionally move rearwardly. This is of particular advantage in the event that it prevents inadvertent movement of the car, even on floors which are provided with a pitch for drainage purposes, should the operator fail to set the parking brake. As a matter of fact, with the device of the present invention there is no need to set the brakes on the car or, in lieu thereof, leave the car in gear.

The position of the stopping device may be selected as desired and its width should be sufficiently wider than the tire itself to provide for variations in the lateral positioning of the car in the garage. Inasmuch as the tread or distance between the tires on all cars does not vary more than an inch or two from a maximum to a minimum width, it is preferable to have two of these stopping devices, each one being so positioned in the floor as to cooperate with each one of the front tires. If desired, however, one long stopping device could be used which would cooperate with both tires at the same time and in the same fashion.

When it is desired to drive the car out of the garage, this is easily accomplished inasmuch as the operating arm 20 will immediately be returned to its original flush position on the floor F when the tire T rolls rearwardly past the rod or shaft 21. At the same time, the stopping plate 30 will drop to its original flush position in the floor F and be aided in such movement by the weight 42. As a result, the flush condition of the plates 20, 30 is restored even before the foremost part of the car has passed rearwardly beyond the stopping device and a safe condition is attained at once. It is to be observed that, whereas the locked, stable relation of the plates 20, 30 completely prevents the forward movement of the tire T beyond the device, it merely deters but does not prevent completely the rearward movement of the car out of the device.

It is thus apparent that the automobile stopping device of the present invention is capable of stopping an automobile or other vehicle at a predetermined place to prevent its passing forwardly beyond that place. At the same time, the automobile is deterred from moving rearwardly away from that place inasmuch as the automobile is in such a stable position as to resist any efforts to move it from that position.

While I have shown and described what I believe to be a preferred embodiment of my invention in the matter of simplicity and durability of construction, ease of operation, etc., it will be obvious that the details of such construction may be more or less modified without departure from the principles of construction or material sacrifice of the advantages of the preferred design.

Variations and modifications of the present invention are possible within the scope of the preceding description or of the following claims without departing from the spirit thereof and portions of the improvements may be used without others.

I claim:

1. An automobile stopping device for use in a recess in a floor to be engaged by a wheel of the automobile comprising an operating member adapted to be engaged by the automobile wheel; means to mount said operating member flush with the floor, said operating member having a force-transmitting arm capable of movement into the recess; a stopping member; and pivot means to mount said stopping member flush with the floor, said stopping member having a force-receiving arm extending under the force transmitting arm and into the path of movement of said force-transmitting arm, and a flush stopping arm extending on the other side of said pivot means, whereby movement of said force-transmitting arm into the recess under the weight of the automobile urges said force-receiving arm into the recess and said stopping arm out of said recess to protrude above the floor to form a stop for the automobile wheel.

2. An automobile stopping device for use in a recess in a floor to be engaged by a wheel of the automobile comprising an operating plate; pivot means to mount said operating plate flush with the floor to be engaged by the automobile wheel, said operating plate having a force-transmitting arm capable of pivotal movement into the recess; a stopping plate; and pivot means to mount said stopping plate flush with the floor, said stopping plate having a force-receiving arm extending below and into the path of pivotal movement of said force-transmitting arm, and a flush stopping arm extending on the other side of said pivot means, whereby pivotal movement of said force-transmitting arm into the recess under the weight of the automobile urges said force-receiving arm into the recess and said stopping arm out of said recess to protrude above the floor to form a stop for the automobile.

3. An automobile stopping device for use in a recess in a floor to be engaged by a wheel of the automobile comprising an operating plate adapted to be engaged by the automobile wheel; pivot means to mount said operating plate flush with the floor, said operating plate having a force-transmitting arm capable of pivotal movement into the recess; a stopping plate; pivot means to mount said stopping plate flush with the floor, said stopping plate having a force-receiving arm extending into the path of pivotal movement of said force-transmitting arm and a flush stopping arm extending on the other side of said pivot means, whereby pivotal movement of said force-transmitting arm into the recess under the weight of the automobile urges said force-receiving arm into the recess and said stopping arm out of said recess to protrude above the floor to form a stop for the automobile; and means connected to at least one of said plates tending to urge it to and maintain said plate in position substantially flush with the floor.

4. An automobile stopping device for use in a recess in a floor to be engaged by a wheel of the automobile comprising an operating plate; pivot means to mount said operating plate flush with the floor to be engaged by the automobile wheel, said operating plate having a force-transmitting arm capable of pivotal movement into the recess; stopping means to limit the extent of pivotal movement of said operating plate; a stopping plate; pivot means to mount said stopping plate flush with the floor, said stopping plate having an angularly related force-receiving arm extending into the path of pivotal movement of said force-transmitting arm and a flush stopping arm extending on the other side of said pivot means, whereby pivotal movement of said force-transmitting arm into the recess under the weight of the automobile urges said force-receiving arm into the recess and said stopping arm out of said recess to protrude above the floor to form a stop for the automobile; and means on the underside of at least one of said plates to tend to maintain said plates flush with the floor.

5. An automobile stopping device to be engaged by a wheel of the automobile comprising a frame adapted to be positioned in a recess in a floor; a flat operating plate; pivot means intermediate the ends of the operating plate to mount said operating plate on the frame to lie flush with the floor to be engaged by the automobile wheel, said operating plate forming a force-transmitting arm capable of pivotal movement into the recess; stopping means carried by the frame to limit the extent of pivotal movement of said operating plate; a stopping plate; and pivot means intermediate the ends of the stopping plate to mount said plate on the frame flush with the floor, said stopping plate having an angularly related force-receiving arm on one side of the pivot means therefor extending into the path of pivotal movement of said force-transmitting arm and a stopping arm extending on the other side of said pivot means and lying flush with the floor, whereby pivotal movement of said force-transmitting arm into the recess under the weight of the automobile urges said force-receiving arm into the recess and said stopping arm out of said recess to protrude above the floor to form a stop for the automobile.

6. An automobile stopping device for use in a recess in a floor to be engaged by a wheel of the automobile comprising side supporting members positioned at the side of said recess; a flat operating plate; pivot means to mount said operating plate on said supporting members and flush with the floor to be engaged by the automobile wheel, said operating plate having a force-transmitting arm capable of pivotal movement into the recess; stopping means engageable by the operating plate to limit the extent of pivotal movement of said plate; a stopping plate; pivot means to mount said stopping plate on said supporting members and flush with the floor, said stopping plate having an angularly related force-receiving arm extending below and into the path of pivotal movement of said force-transmitting arm to be engaged thereby, and a flush stopping arm extending on the other side of said pivot means, said stopping arm being flush with the floor and forming a reflux angle with said force-receiving arm whereby pivotal movement of said force-transmitting arm into the recess moves said force-receiving arm under the weight of the automobile and causes said stopping arm to be raised and protrude above the floor to form a stop for the automobile; and means connected to the stop plate to urge said plate into flush position and to maintain said plate flush with the floor against unintentional raising thereof.

JAMES H. MULLINS.

References Cited in the file of this patent

UNITED STATES PATENTS

| Number | Name | Date |
| --- | --- | --- |
| 1,922,554 | McCosh | Aug. 15, 1933 |
| 1,993,648 | Cook | Mar. 5, 1935 |
| 2,247,717 | Sutter | July 1, 1941 |
| 2,285,989 | Kroll | June 9, 1942 |
| 2,585,126 | Holland | Feb. 12, 1952 |

FOREIGN PATENTS

| Number | Country | Date |
| --- | --- | --- |
| 593,105 | Germany | Feb. 21, 1934 |